July 11, 1967 S. A. MARCUS ET AL 3,329,996
APPARATUS FOR SCRAPLESS BLOW MOLDING OF PLASTIC RECEPTACLES
Filed Oct. 10, 1963 6 Sheets-Sheet 1
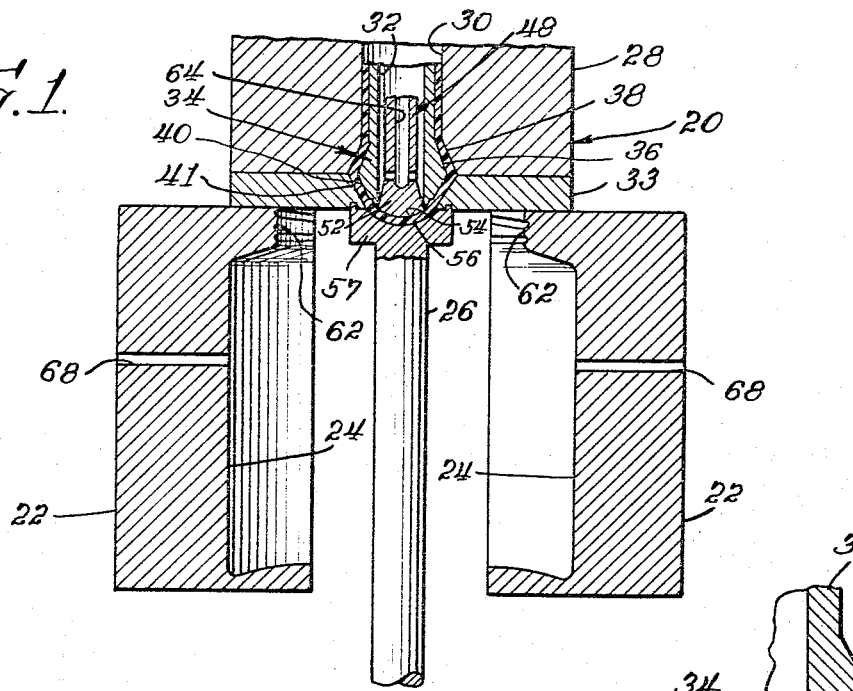
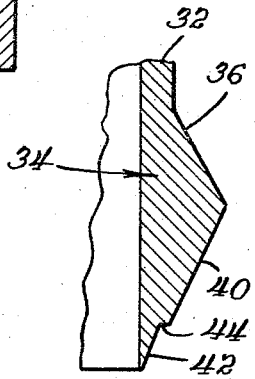
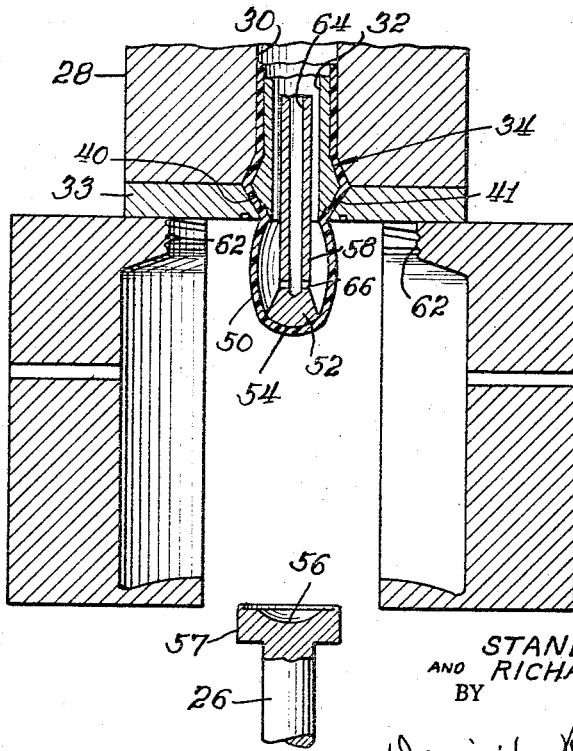
INVENTORS
STANLEY A. MARCUS
AND RICHARD J. LEE
BY
ATT'YS

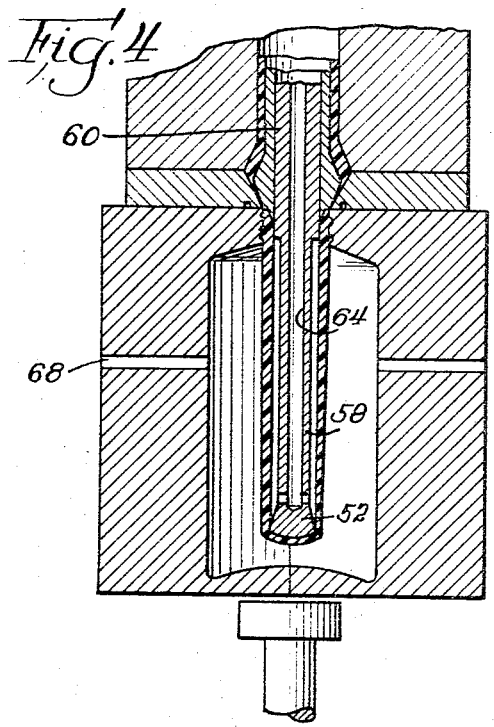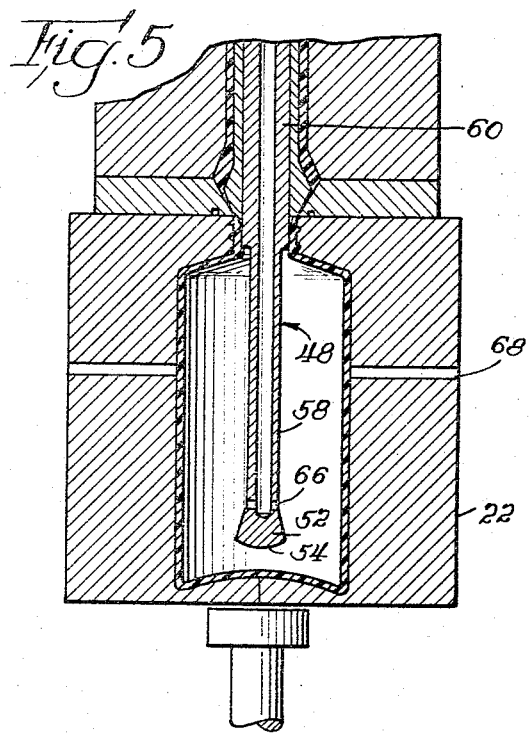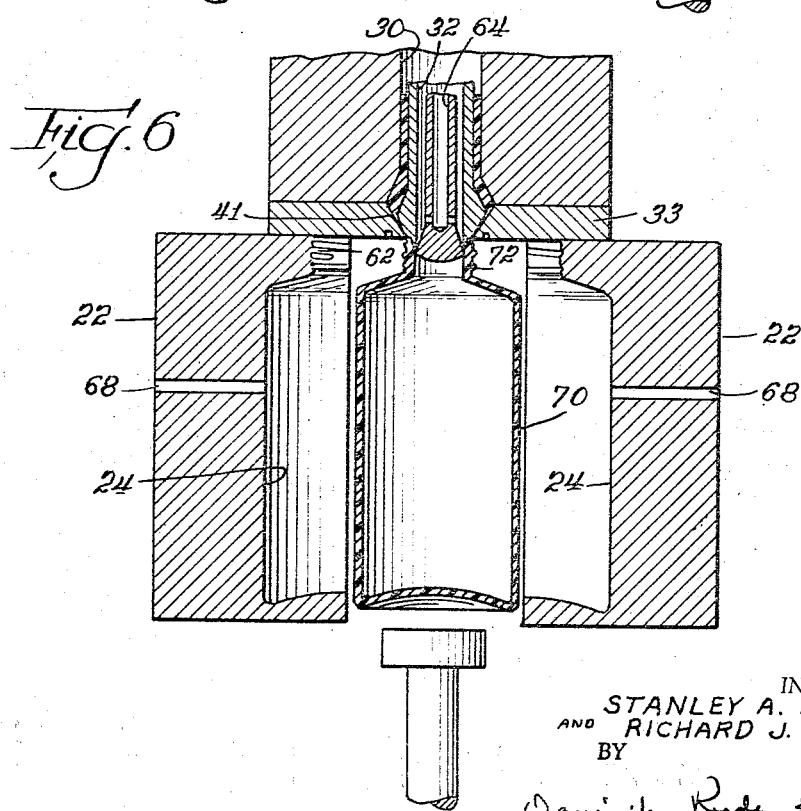

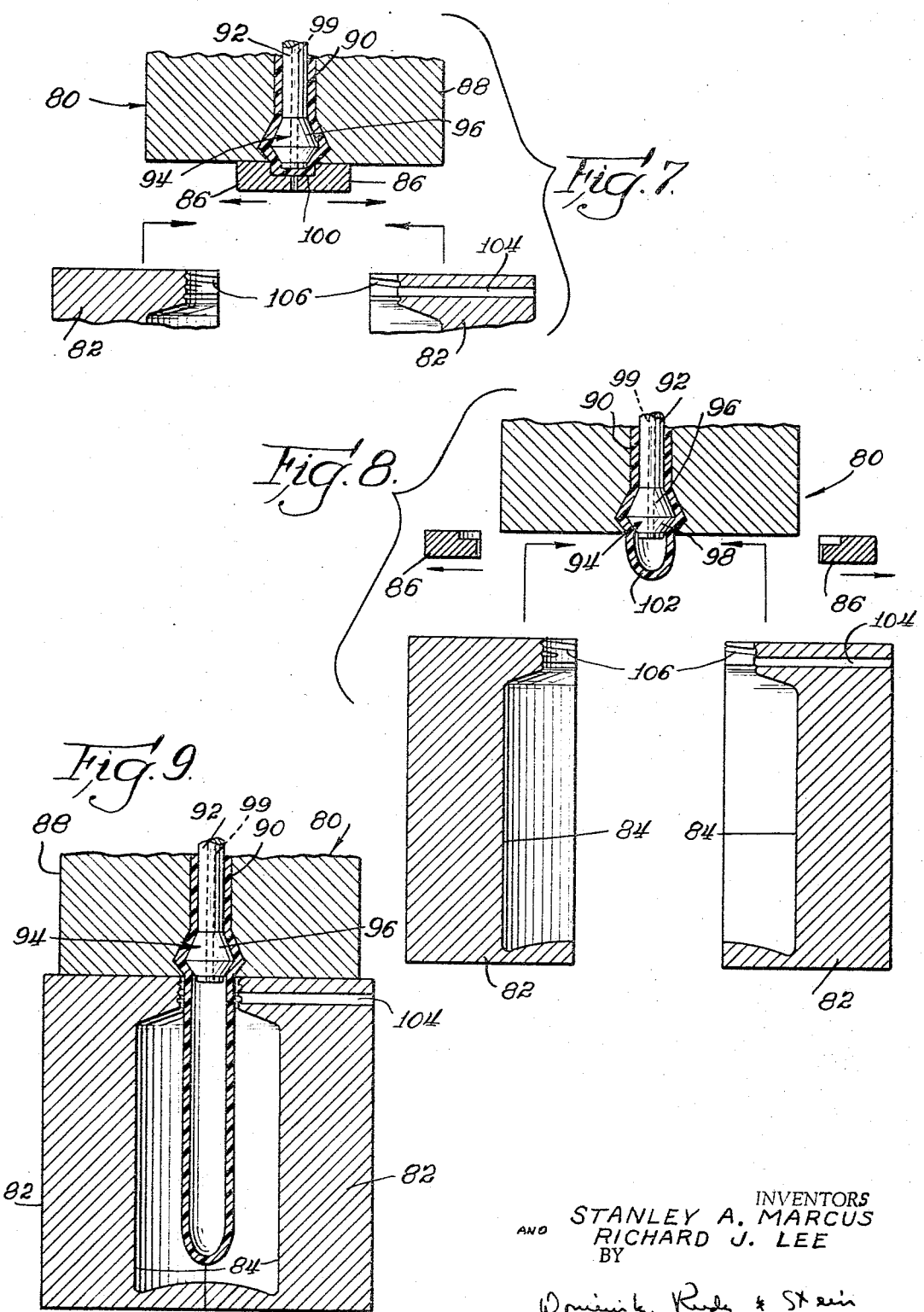

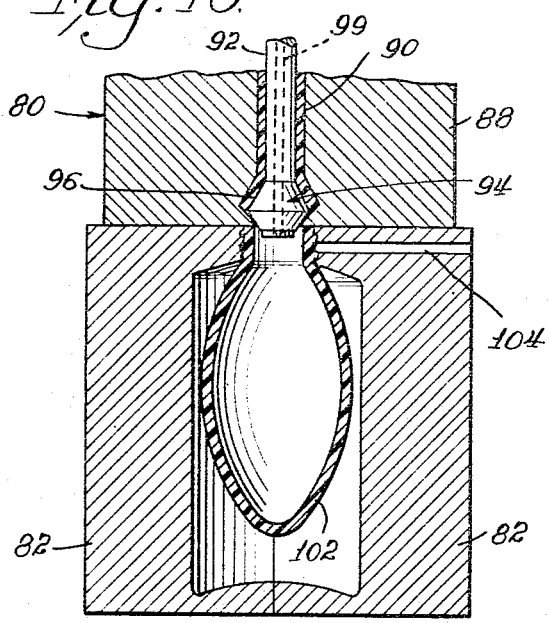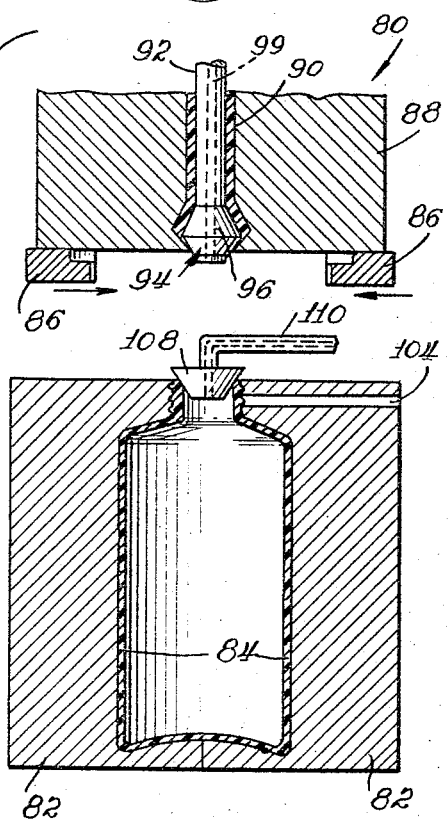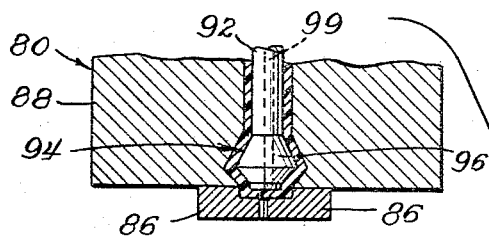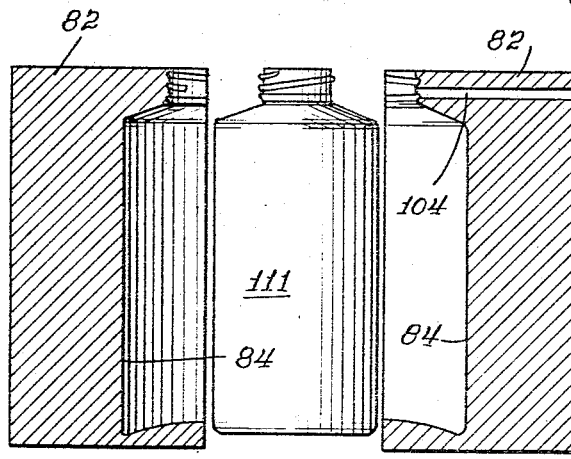
Fig. 10.
Fig. 11.
Fig. 12.
INVENTORS
STANLEY A. MARCUS
AND RICHARD J. LEE
BY
ATT'YS.

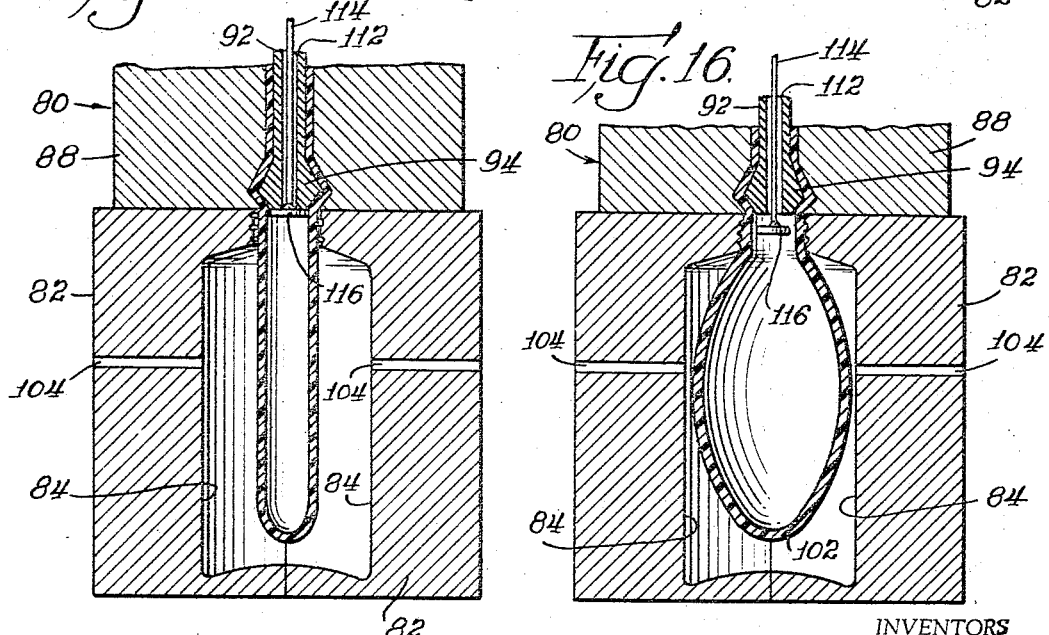

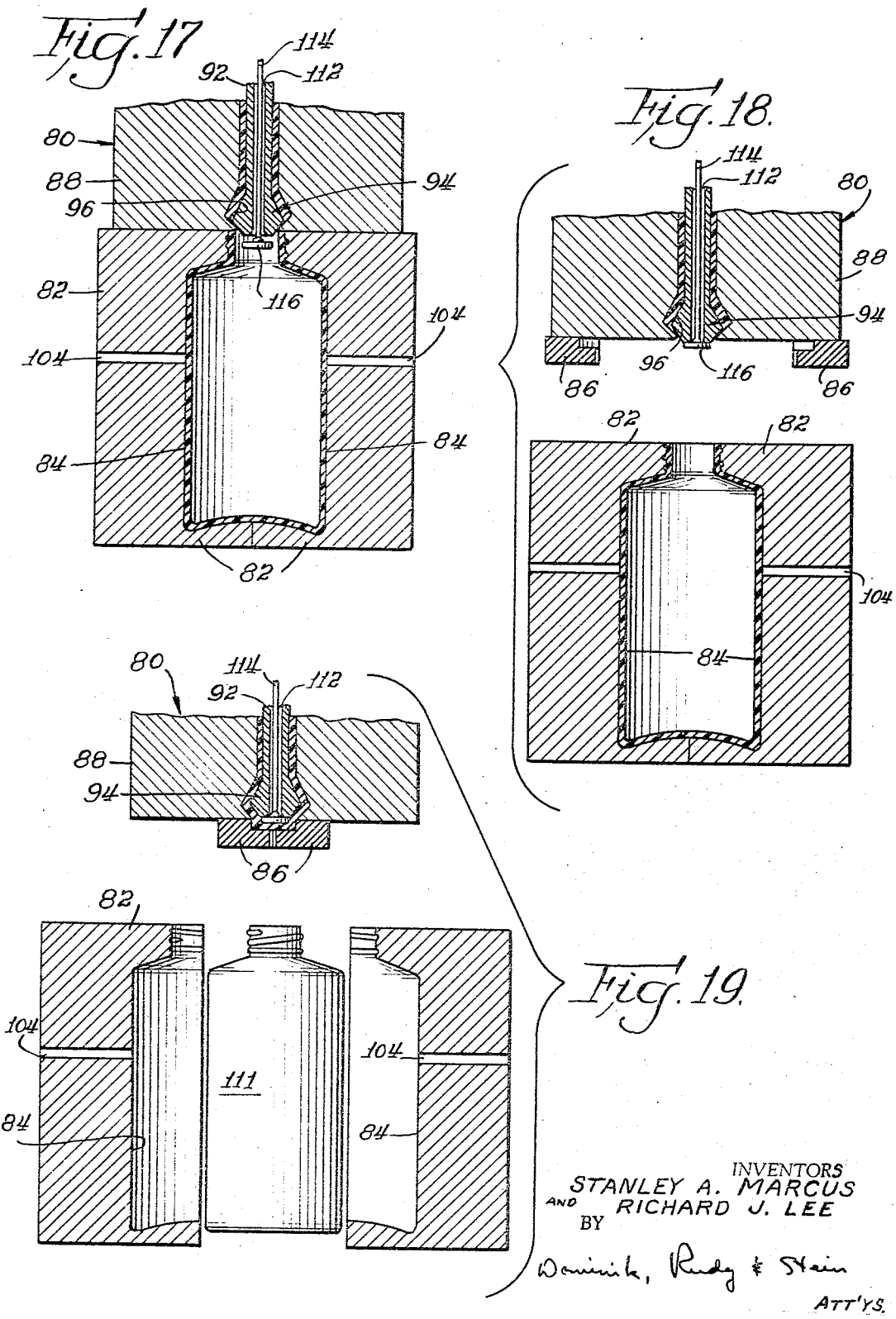

United States Patent Office
3,329,996
Patented July 11, 1967

3,329,996
APPARATUS FOR SCRAPLESS BLOW MOLDING OF PLASTIC RECEPTACLES
Stanley A. Marcus and Richard J. Lee, Midland, Mich., assignors to The Dow Chemical Company, Midland, Mich., a corporation of Delaware
Filed Oct. 10, 1963, Ser. No. 315,411
4 Claims. (Cl. 18—5)

This invention relates to an apparatus for the blow molding of plastic receptacles, and more particularly to an apparatus which eliminates scrap in a blown plastic bottle.

The formation of plastic bottles by extruding a parison and blowing the parison into engagement with the walls of a surrounding die cavity, is a much used technique. Many different methods and apparatus have been proposed and utilized with varying degrees of success for the production of such bottles using such technique. Two disadvantages often associated with many of the known methods and/or apparatus are, labor and material costs as required by bottle trimming operations, and difficulty in maintaining wall thickness of the blown bottle within an optimum range. The first of these disadvantages is inherent in many known plastic bottle blowing operations, wherein flashing and excess material must be removed. The second of these disadvantages results from the provision of a constant wall thickness of the parison over its entire length; consequently, when the parison is expanded in a blowing operation, certain parts thereof will be stretched more than other parts, causing variation in the final wall thickness of the bottle.

The apparatus of the present invention is characterized by elimination of these two disadvantages. Briefly, the apparatus of the present invention provides for the formation of a closed end parison, which is blown to final bottle size within split mold cavities, without formation of any trim portions, and with a finished neck portion. The mold cavities may be arranged to provide threads in the neck portion of the finished bottle if so desired. In the apparatus of the invention, the thickness of the closed end parison may be regulated to compensate for thinning during parison blowing, thus the final wall thickness of the bottom of the bottle can be controlled. Lastly, the plastic flow control mandrel utilized in the apparatus of the invention may be operated to vary the parison wall thickness along its length as required to compensate for different lateral expansion of the parison during a blowing operation.

The main object of this invention is to provide an improvement in an apparatus for the formation of plastic bottles by the blown parison technique.

A more specific object is to provide an apparatus for the formation of blown plastic bottles wherein loss due to scrap is eliminated, and completely finished neck portions are formed in a mold.

Another specific object is to provide an apparatus for the formation of blown plastic bottles wherein the wall thickness of the finished bottles will be within specified tolerances as desired in various portions of each bottle.

These and further objects and features of the invention will become more apparent from the following description and accompanying drawings wherein:

FIG. 1 is a sectionalized elevation view of molding apparatus illustrative of a first embodiment of the invention and showing an initial stage of a molding operation;

FIG. 2 is the same but showing a closed end parison extrusion at an early stage of formation;

FIG. 3 is an enlarged fractional section view of a head end of a mandrel used in the apparatus of FIG. 1;

FIG. 4 is the same as FIG. 2 but showing substantially full length parison extrusion and with surrounding die molds in closed position;

FIG. 5 is the same but showing the parison after expansion into full engagement with the walls of a die cavity;

FIG. 6 is the same but showing the completed bottle with the die molds in open position;

FIG. 7 is a partial elevation view of a second embodiment of the invention;

FIG. 8 is the same, but showing full length molding dies and initial formation of a closed end parison extrudate;

FIG. 9 is the same but showing substantially full length parison extrusion, and with surrounding die molds in closed position;

FIG. 10 is the same but showing an initial stage of parison expansion with the use of vacuum;

FIG. 11 is the same but showing a final stage of parison expansion with the use of a pressure fluid;

FIG. 12 is the same but showing a completed container and the die molds in open position;

FIG. 13 is a partial elevation view of a third embodiment of the invention;

FIG. 14 is the same but showing full length molding dies in open position and initial formation of a closed end parison extrudate;

FIG. 15 is the same but showing substantially full length parison extrusion, and with surrounding die molds in closed position;

FIG. 16 is the same but showing an initial stage of parison expansion with the use of vacuum;

FIG. 17 is the same but showing final stage of parison expansion with the use of pressure fluid;

FIG. 18 is the same but showing the completed container and prior to die mold opening; and FIG. 19 is the same but showing the die molds in open position for release of the finished container.

Referring now to the drawings and more particularly to FIG. 1 to FIG. 5, bottle blowing apparatus is shown which includes a parison extruding die assembly 20, a pair of molding dies 22 having symmetrically disposed die cavities 24, and a parison bottom forming plunger 26.

The extruding die assembly includes a head piece 28 having a vertically disposed circular passageway 30, a mandrel 32 in the passageway 30 and in uniform spaced relation to the wall thereof, and an orifice plate 33. Mandrel 32 has a head portion 34 at the lower extremity, which is formed to provide a reverse conical configuration identified by an upper conical surface 36, having a slope at the same angle as a conical surface 38 provided at the lower end of the passageway 30, and a lower conical surface 40 which slopes in the opposite direction to the slope of the conical surface 36 and is in spaced relation to conical surface 41 formed in the orifice plate 33. The passageway defined by conical surfaces 36 and 38 serves to control pressure, while the passageway defined in part by conical surfaces 40 and 41 serves to control parison thickness and flow. The lower conical surface 40, as best seen in FIG. 3, is stepped down to provide an adjoining conical surface 42; a horizontally disposed flat surface 44 interconnects the conical surfaces 40 and 42. As will be more apparent hereinafter, the conical surface 42 and flat surface 44 respectively, form a tapered inner edge and a flat top edge of a neck portion of a bottle made in the apparatus. The tapered opening 41 of orifice plate 33 slopes slightly less than that of the adjacent lower conical surface 40. The minor diameter of the opening 46 is substantially equal to the diameter of the head portion 34 at the point of intersection of the lower conical surface 40 and the flat surface 44.

Means (not shown) are provided to move the mandrel 32 upwardly to fully open position, as illustrated in FIGS. 1 and 2, and downwardly to fully closed position, as illustrated in FIG. 6. It will be noted that when the mandrel is in fully open position, an annular plastic material flow passageway is provided about the mandrel head portion, which annular passageway is of equivalent volume capacity as the passageway provided between the mandrel and head piece passageway 30. Likewise, when the mandrel is in fully closed position, the lower edge of the conical surface 40 will abut the edge region of the orifice plate tapered opening 41, to shut off flow of plastic material about the mandrel head portion.

Slidably arranged in the mandrel 32 is a parison rod 48 which serves a four-fold purpose, namely, to assist in the formation of a closed end tubular parison 50, to assist in the extrusion of the parison, to direct compressed air to the interior of the extruded parison, and to assist in thread formation at the neck portion of a bottle being fabricated in the molds 22. The lower end of the rod 48 has a head portion 52 with a convex surface 54, which is of similar shape to a concave surface 56 formed in a disc-like head 57 which provides a movable abutment arranged at the upper end of the forming plunger 26. The major diameter of the rod head portion is adapted to slidingly fit within the mandrel 32. Means (not shown) are provided for reciprocating the rod 48 in a predetermined manner during a bottle fabricating operation, as will be more apparent hereinafter. Likewise, means (not shown) are provided to move the forming plunger 26 between the positions shown in FIGS. 1 and 2.

The rod 48 has a reduced diameter portion 58 which extends between the head 52 and a body portion 60 of the rod, the body portion having a diameter providing a sliding fit with the mandrel 32. The lower end of the body portion 60 is arranged to project into a threaded neck portion 62 formed in the upper end of each molding die 22, when the rod 48 is in lowermost position, as illustrated in FIGS. 4 and 5. In such manner, plastic material of the parison 50 is forced into snug engagement with the threads of the molding die neck portions 62 to thus assure good formation of threads on the bottle being made in the molding dies. An axial passageway 64 is arranged in the rod 48, the lower end of said passageway being in open communication with the space between the reduced diameter portion 58 and the mandrel passageway 30, by means of a plurality of radial holes 66.

The molding dies 22 are advantageously provided with passageway means 68 whereby the cavities 24 may be vented during a bottle blowing operation. Means (not shown) are provided for maintaining the upper end of the molding dies 22 in sliding engagement with the lower surface of the orifice plate 33, and for moving the dies from fully open position (FIG. 1) to fully closed position (FIG. 4) in timed sequence with parison extrusion and bottle blowing operations.

A bottle forming operation, utilizing the above disclosed apparatus, will now be described. Assume that the various movable elements of the apparatus are as shown in FIG. 1, and that extrudable plastic material is forced under pressure downwardly about the mandrel 32. A closed bottom cylindrical plastic form will be made, which will be extruded downwardly between the open molding dies 22 as soon as the bottom forming plunger 26 is retracted from its upward position (FIG. 2). During such extrusion of the parison 50, the head 52 of the rod 48 will be maintained in contact with the parison until end of stroke is attained, as shown in FIG. 4. It may be mentioned that the rate of plastic extrusion as well as the rate of downward travel of the rod 48, may be utilized to control wall thickness of the parison 50. In such manner, proper or desired wall thickness of the finished bottle being fabricated may be controlled.

In the final phase of parison extrusion, the mandrel 32 is moved downwardly to cut off flow of plastic material, which movement results in formation of the tapered inner end and upper flat edge of the bottle neck portion, by virtue of the conical surface 42 and flat surface 44, respectively. As soon as the forming plunger head 58 has closed the lower portion of the molding dies 22, the latter are closed, such action resulting in the formation of the threads on the exterior surface of the parison 50, as seen in FIG. 4. As mentioned heretofore, the body portion 60 of the mandrel forms an abutment so that the plastic material in the region of the parison thread portion is urged into the threaded groove of the die neck portions 62, to thus assure good thread formation on the bottle neck.

An expansion medium, such as compressed air, is then admitted to the inside of the parison 50 via the rod passageway 64 and holes 66, which causes an expansion of the parison into contact with the walls of the die cavities 24 (FIG. 5). Venting of the exterior of the parison via passageways 68, will create a pressure differential on the parison which assures full engagement of the expanded parison with the cavity wall.

After the parison is thus expanded to form a bottle 70 having a threaded neck portion 72, it will quickly harden or set-up by virtue of the cooling effect afforded by the walls of the die cavities. In the event it is desired to expedite such bottle cooling, or set-up, the molding dies 22 may be provided with cooling means, such as passageways (not shown), through which a cooling medium may be circulated.

After the bottle is formed, the parison rod 48 is withdrawn from the bottle and the molding dies 22 are opened so that the bottle may be removed therefrom (FIG. 6). It will be noted that a completely finished bottle, including a finished neck, will be produced by the method and apparatus of the invention. In other words, there should be no need for subsequent trimming operations on the bottles, since they will be free of flash, or parting line scrap. It will be seen that the method and apparatus of the invention will produce blown plastic bottles of high quality, that is, bottles having wall thicknesses that can be accurately maintained within specified tolerances.

A second embodiment of the invention, which involves a method and apparatus for the fabrication of finished blown plastic bottles from closed end parisons, is illustrated in FIGS. 7 to 12 inclusive. Such apparatus includes a parison extruding die assembly 80, a pair of molding dies 82, having symmetrically disposed die cavities 84, and parison bottom forming means comprising a pair of symmetrically formed plate means 86.

The extruding die assembly includes a head piece 88 having a vertically disposed circular passageway 90, and a mandrel 92 in the passageway 90 and in uniform spaced relation to the wall thereof. Mandrel 92 has a head portion 94 at the lower extremity which is formed to provide a reverse conical configuration identified by an upper conical surface 96, and a lower conical surface 98, the slope of the wall thereof being at a reverse angle to the slope of the wall of the upper conical surface 96. The lower end of the head piece passageway 90 is enlarged to accommodate the mandrel head portion 94 in spaced relation so that a substantially constant volume flow path is provided about the mandrel head portion when the mandrel is in open position, as shown in FIG. 7. A venting passageway 99 is provided in the mandrel, which passageway is open to atmosphere so that pressure in the parison to be formed will be atmospheric, for reasons which will later herein be apparent. Means (not shown) are provided for moving the mandrel downwardly so that the lower conical surface 98 will seat upon the lower opening of the passageway 90, to shut off flow of plastic material, as seen in FIGS. 10 and 11.

The plate means 86 are formed to provide a circular recess 100 on the upper surface which serve to assist in the formation of a closed end of a parison 102 extruded from the die assembly 88. Means (not shown) are provided for reciprocating the plate means in sliding engagement with the under surface of the head piece 88.

The upper end of the molding dies 82, which form the neck portion of a bottle, are provided with one or more passageways 104 connected to a source of subatmospheric pressure, and may have spiral grooves 106 which form a thread on the exterior of the bottle neck portion.

A bottle blowing means is provided which includes a frusto-conical plug 108 affixed to the end of a pipe 110 (FIG. 11). The pipe 110 is connected to a source of pressurized fluid (not shown) such as compressed air. The bottle blowing means is movable into and out of bottle blowing position, as illustrated in FIG. 11, by mechanical means (not shown).

The operation of the second disclosed embodiment is as follows. Assume that the relative positions of the movable parts of the apparatus are as shown in FIG. 7. Plastic material in flowable condition is caused to pass about the head portion 94 and enter the circular recess 100 formed in the plate means 86, which material will form the closed end of the parison 102. The plate means 86 are then moved apart, as shown in FIG. 8, and pressure is exerted upon the plastic material to cause extrusion of the parison 102. When the parison has reached a given length, the mandrel 92 is moved downwardly to cut off further extrusion of plastic material, and the molding dies 82 are moved together, all as shown in FIG. 9.

The pressure in passageways 104 is reduced to sub-atmospheric, causing the parison to initially expand because of differential pressure acting thereon. Such expansion will place a portion of the parison in contact with the walls of the die cavities, whereby some support will be given to the extruded parison (FIG. 10). Relative movement is then effected between the closed molding dies 82 and the extruding die assembly 80 to provide a space for the bottle blowing means, i.e., plug 108 and pipe 110, to be moved into the end of the parison 102 (FIG. 11). It will be noted that during the bottle blowing operation, the plate means 86 are moved together in readiness for another parison bottom formation. Compressed air is directed to the interior of the parison causing it to be blown or expanded into engagement with the walls of the die cavities 84, to thus form a bottle 111. It will be appreciated that the pressure of the compressed air will cause the upper end of the parison to be forced into engagement with the spiral grooves 106, to form threads on the exterior of the parison. Upon completion of the blowing operation, the molding dies 82 are moved apart so that the completed bottle 111 is released therefrom (FIG. 12). The apparatus is then in readiness for another bottle formation cycle.

A third embodiment of the invention is shown in FIGS. 13 to 19 inclusive, which third embodiment differs from the second embodiment shown in FIGS. 7 to 12 inclusive, only in the details of the bottle blowing means. Parts in common between these two embodiments will be identified by use of the same numerals. Also, to avoid repetition, only as much of the third embodiment which differs structurally from that of the second embodiment will be described.

Referring now to FIGS. 13 et seq., the mandrel 92 is provided with an axial passageway 112 in which a valve rod 114 is movably mounted. The valve rod 114 has a diameter substantially less than the diameter of the axial passageway 112. A valve head 116 is affixed to the bottom end of the rod 114 for seating against the lower end of the mandrel, which head serves a two-fold purpose, namely, to form an abutment for the upper surface of the closed end parison during initial formation thereof, and second, to act as a valve for control of compressed air flow during a parison blowing operation. Means (not shown) are provided for reciprocating the valve rod 114, as required during a bottle blowing operation.

The operation of the third embodiment is as follows. Assume that the plate means 86 are arranged in abutment and that the closed end of the parison has been formed (FIG. 13). The plate means 86 are then moved apart and pressure is applied to the plastic material to cause extrusion thereof and the formation of the parison 102 (FIG. 14). When the parison reaches a predetermined length, plastic flow is cut off by seating of the mandrel head, and the molding dies 82 are moved upward into contact with the extruding assembly. Alternatively, upward movement of the molding dies may be simultaneous with parison extrusion. The molding dies are brought together, thus enclosing the parison (FIG. 15). Prior to moving of the molding dies 82 together, the plate means 86 will be moved apart a sufficient distance so that the molding dies and extruding head may be brought together. During parison extrusion, the valve head may be unseated slightly to assure that some pressure is maintained within the parison, so that it will not collapse. A sub-atmospheric pressure is then applied to the exterior of the parison by virtue of connection of the die mold cavities 84 with a source of vacuum via passageways 104, to initiate expansion of the parison, as shown in FIG. 16.

The valve head 116 is then unseated, and compressed air is admitted to the inside of the parison 102 to blow or expand it into engagement with the walls of the cavities 84, to form the bottle 111. Such internal pressure will, of course, force the upper end of the parison into the spiral groove 106 to form the threads on the exterior surface of the bottle.

The molding dies 82 are then opened and the finished bottle 111 is removed (FIG. 19). The movable parts of the apparatus are then in position for another bottle forming operation.

It will be seen from the foregoing that the apparatus of all three embodiments will satisfy the objectives set forth hereinbefore. It is to be noted that in each of the three embodiments disclosed, the thickness of the closed end of the parison may be controlled so that it will thin out to provide the desired thickness of the bottle bottom after formation thereof. It will be further noted that in each of the three embodiments, axial movement of the mandrel may be regulated during parison formation so that certain areas of the parison may be given different thickness as required to form a bottle of controlled wall thickness. In other words, those portions of the parison which will be more greatly expanded during blowing, may have greater thickness than those portions of the parison which are not expanded as much during bottle formation.

Certain structural details have not been shown in the drawings. For example, passages for cooling medium, such as water, may be provided in the molding dies to expedite set-up of the material of the blown plastic bottle. Likewise, passages for heating medium may be provided in the extruding head to maintain the plastic material in sufficiently heated condition so that it will remain in flowable condition. The use or need of such detailed structure is, of course, well understood by those skilled in the art to which this invention pertains. It is to be noted that in all three embodiments, the neck portion of any molded bottle will be completely finished during a molding operation. In other words, no subsequent trimming operation is required once the bottle is removed from the molds.

The foregoing description has been given in detail without thought of limitation since the inventive principles involved are capable of assuming other forms without departing from the spirit of the invention or the scope of the following claims.

What is claimed is:

1. Apparatus for forming a scrapless blown plastic bottle comprising in combination, an extruding die assembly including a head piece, said die assembly having plastic extrusion means therein, a round passageway within said head piece, a mandrel having a head portion formed with oppositely sloped conical portions joined at a plane of maximum diameter therebetween, said mandrel being positioned within said passageway in spaced relation to the walls thereof to form an annular path for flow of plastic from said plastic extrusion means about said mandrel and its head portion, said mandrel being movable whereby its head portion can be positioned to control the thickness of a parison being extruded, said mandrel being seatable in the head piece to terminate flow of plastic material out of said passageway, an abutment means positionable at the end of said passageway exterior of said head piece, said abutment means providing an enclosure space at the end of said mandrel wherein a closed end to said parison may be formed, said abutment means being movable axially relative to said mandrel, a parison rod slidably arranged in said mandrel and extendable from the end thereof, said parison rod being arranged to control flow of a pressurized medium through said mandrel, and a pair of split molding dies having bottle forming cavities therein in positional alignment with said head piece and adapted to be opened and closed to receive said parison therein and to remove said bottle after said bottle is formed.

2. The apparatus of claim 1, wherein said conical portion at the lower end of the mandrel is sloped toward the axis of the mandrel and is provided with a stepped-down conical portion adapted to form a countersunk edge on the parison being formed by the apparatus.

3. The apparatus of claim 1, wherein said abutment means is in slidable engagement with said head piece and is movable to uncover the end of said passageway.

4. Apparatus for forming a scrapless blown plastic bottle comprising, an extruding die assembly including a head piece, said die assembly having plastic extrusion means therein, a passageway within said head piece, a mandrel having an enlarged head portion positioned within said passageway in spaced relation to the walls thereof to form an annular path for flow of plastic from said plastic extrusion means about said mandrel and its head portion, said mandrel being movable and seatable whereby its head portion can be positioned in said passageway to control and to cut off the flow of plastic being extruded, a movable abutment means positionable at the end of said passageway exterior of said head piece, said abutment means providing an enclosure space at the end of said mandrel wherein a closed end may be formed on a parison when plastic is extruded, and a pair of split molding dies having bottle forming cavities therein in positional alignment with said head piece and adapted to be opened and closed to receive said parison therein and to remove said bottle after said bottle is formed.

References Cited

UNITED STATES PATENTS

| | | | |
|---|---|---|---|
| 2,175,054 | 10/1939 | Ferngren et al. | 18—5 |
| 2,750,625 | 6/1956 | Colombo | 18—5 |
| 2,861,295 | 11/1958 | Hagen et al. | 18—5 |
| 2,890,483 | 6/1959 | Soubier | 18—5 |
| 3,019,481 | 2/1962 | Negoro | 18—5 |
| 3,081,489 | 3/1963 | Jackson et al. | 18—5 |
| 3,084,382 | 4/1963 | Stuchbery | 18—5 |
| 3,114,932 | 12/1963 | Donnelly | 18—5 |
| 3,196,592 | 7/1965 | Cheney | 18—5 |
| 3,197,532 | 7/1965 | Maass | 264—98 |
| 3,217,071 | 11/1965 | Plymale et al. | 264—98 |

OTHER REFERENCES

Plastic World, vol. 21, pp. 32 and 33, 18–5 (June 1963).

J. SPENCER OVERHOLSER, *Primary Examiner.*

W. L. McBAY, *Assistant Examiner.*